(12) United States Patent
Zhang et al.

(10) Patent No.: US 8,973,366 B2
(45) Date of Patent: Mar. 10, 2015

(54) INTEGRATED FUEL AND WATER MIXING ASSEMBLY FOR USE IN CONJUNCTION WITH A COMBUSTOR

(75) Inventors: Hua Zhang, Greer, SC (US); Douglas Frank Beadie, Greer, SC (US); Douglas Scott Byrd, Greer, SC (US); Fabien Thibault Codron, Simpsonville, SC (US); James Frederik den Outer, Simpsonville, SC (US); Mark Jason Fisher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 13/280,216

(22) Filed: Oct. 24, 2011

(65) Prior Publication Data

US 2013/0097991 A1    Apr. 25, 2013

(51) Int. Cl.
| | | |
|---|---|---|
| *F02C 1/00* | (2006.01) | |
| *F02G 3/00* | (2006.01) | |
| *F23K 5/12* | (2006.01) | |
| *F23K 5/06* | (2006.01) | |
| *F02C 3/30* | (2006.01) | |

(Continued)

(52) U.S. Cl.
CPC ... *F23K 5/12* (2013.01); *F23K 5/06* (2013.01); *F05D 2210/13* (2013.01); *F02C 3/30* (2013.01); *F02C 7/222* (2013.01); *F02C 9/40* (2013.01); *F05D 2260/607* (2013.01); *Y02T 50/675* (2013.01)
USPC ............ 60/734; 137/897; 137/898; 60/39.59; 60/39.461; 60/39.463

(58) Field of Classification Search
CPC ............... F23K 5/06; F23K 5/12; F02C 9/40; F02C 3/30; F02C 3/20; F02C 7/22
USPC ............. 60/734, 39.59, 39.3, 39.461, 39.463; 137/897, 898
See application file for complete search history.

(56) References Cited

U.S. PATENT DOCUMENTS

| | | | | |
|---|---|---|---|---|
| 3,766,942 | A | * | 10/1973 | Delatronchette et al. ......................... 137/565.29 |
| 4,110,973 | A | * | 9/1978 | Haeflich et al. .................. 60/775 |

(Continued)

FOREIGN PATENT DOCUMENTS

| | | |
|---|---|---|
| EP | 0517646 A2 | 12/1992 |
| EP | 0958853 A1 | 11/1999 |

OTHER PUBLICATIONS

U.S. Appl. No. 13/280,200, filed Oct. 24, 2011, Hua Zhang.

(Continued)

*Primary Examiner* — William H Rodriguez
(74) *Attorney, Agent, or Firm* — Fletcher Yoder, P.C.

(57) ABSTRACT

A system includes a mixing assembly configured to mix a liquid fuel and a water to generate a fuel mixture. The fuel mixture is configured to combust in a combustor of a gas turbine. The mixing assembly includes a liquid fuel passage disposed in an integrated housing. The liquid fuel passage is configured to flow the liquid fuel and to exclude liquid traps. The mixing assembly also includes a water passage disposed in the integrated housing. The water passage is configured to flow the water and to exclude liquid traps. The mixing assembly also includes a mixer disposed in the integrated housing and coupled to the liquid fuel passage and the water passage. The mixer is configured to mix the liquid fuel and the water to form the fuel mixture.

18 Claims, 5 Drawing Sheets

(51) Int. Cl.
  *F02C 7/22* (2006.01)
  *F02C 9/40* (2006.01)

(56) References Cited

U.S. PATENT DOCUMENTS

| | | | |
|---|---|---|---|
| 4,418,543 A | 12/1983 | Faucher et al. | |
| 4,597,671 A * | 7/1986 | Marelli | 366/127 |
| 4,798,330 A | 1/1989 | Mancini et al. | |
| 4,918,925 A | 4/1990 | Tingle | |
| 4,993,918 A | 2/1991 | Myers et al. | |
| 5,240,741 A | 8/1993 | Edwards, III et al. | |
| 5,249,957 A * | 10/1993 | Hirata | 431/354 |
| 5,298,091 A | 3/1994 | Edwards, III et al. | |
| 5,324,544 A | 6/1994 | Spence et al. | |
| 5,448,890 A | 9/1995 | Coughlan, III et al. | |
| 5,809,771 A | 9/1998 | Wernberg | |
| 6,038,848 A | 3/2000 | Frutschi | |
| 6,125,624 A | 10/2000 | Prociw | |
| 6,132,202 A * | 10/2000 | Eroglu et al. | 431/8 |
| 6,145,294 A | 11/2000 | Traver et al. | |
| 6,250,065 B1 * | 6/2001 | Mandai et al. | 60/776 |
| 6,311,472 B1 * | 11/2001 | Nicodemus | 60/775 |
| 6,315,815 B1 | 11/2001 | Spadaccini et al. | |
| 6,397,602 B2 | 6/2002 | Vandervort et al. | |
| 6,427,447 B1 | 8/2002 | Sowa | |
| 6,438,938 B1 | 8/2002 | Burkholder et al. | |
| 6,457,316 B1 | 10/2002 | Czachor et al. | |
| 6,598,383 B1 | 7/2003 | Vandervort et al. | |
| 6,668,541 B2 | 12/2003 | Rice et al. | |
| 6,679,060 B2 * | 1/2004 | Hellat et al. | 60/775 |
| 6,712,080 B1 | 3/2004 | Handschuh et al. | |
| 6,848,260 B2 | 2/2005 | North et al. | |
| 6,886,324 B1 | 5/2005 | Handshuh et al. | |
| 6,915,638 B2 | 7/2005 | Runkle et al. | |
| 6,918,255 B2 | 7/2005 | Kaplan et al. | |
| 6,931,853 B2 | 8/2005 | Dawson | |
| 6,935,116 B2 | 8/2005 | Stuttaford et al. | |
| 6,986,254 B2 | 1/2006 | Stuttaford et al. | |
| 7,007,476 B2 | 3/2006 | Mains et al. | |
| 7,104,070 B2 | 9/2006 | Iasillo et al. | |
| 7,117,675 B2 | 10/2006 | Kaplan et al. | |
| 7,137,242 B2 | 11/2006 | Griffiths | |
| 7,137,256 B1 | 11/2006 | Stuttaford et al. | |
| 7,690,184 B2 | 4/2010 | Gauthier et al. | |
| 8,016,300 B2 * | 9/2011 | Cramer et al. | 280/43.14 |
| 2009/0165435 A1 | 7/2009 | Koranek | |
| 2010/0058770 A1 | 3/2010 | Ryan | |
| 2010/0199939 A1 | 8/2010 | Cottell | |
| 2010/0236134 A1 * | 9/2010 | Mogami et al. | 44/301 |
| 2013/0098041 A1 * | 4/2013 | Zhang et al. | 60/734 |

OTHER PUBLICATIONS

U.S. Appl. No. 13/280,237, filed Oct. 24, 2011, Hua Zhang.
U.S. Appl. No. 13/280,265, filed Oct. 24, 2011, Hua Zhang.
http://www.seitz.ch/pdf/company/en.ImageBrochure.pdf , last viewed Aug. 1, 2010 (9 pages).
http://www.seitz.ch/en/ind/team.php, Seitz Company presentation 2010, Jan. 1, 2010 (23 pages).
Search Report and Written Opinion from EP Application No. 12189165.9 dated May 2, 2013.

* cited by examiner

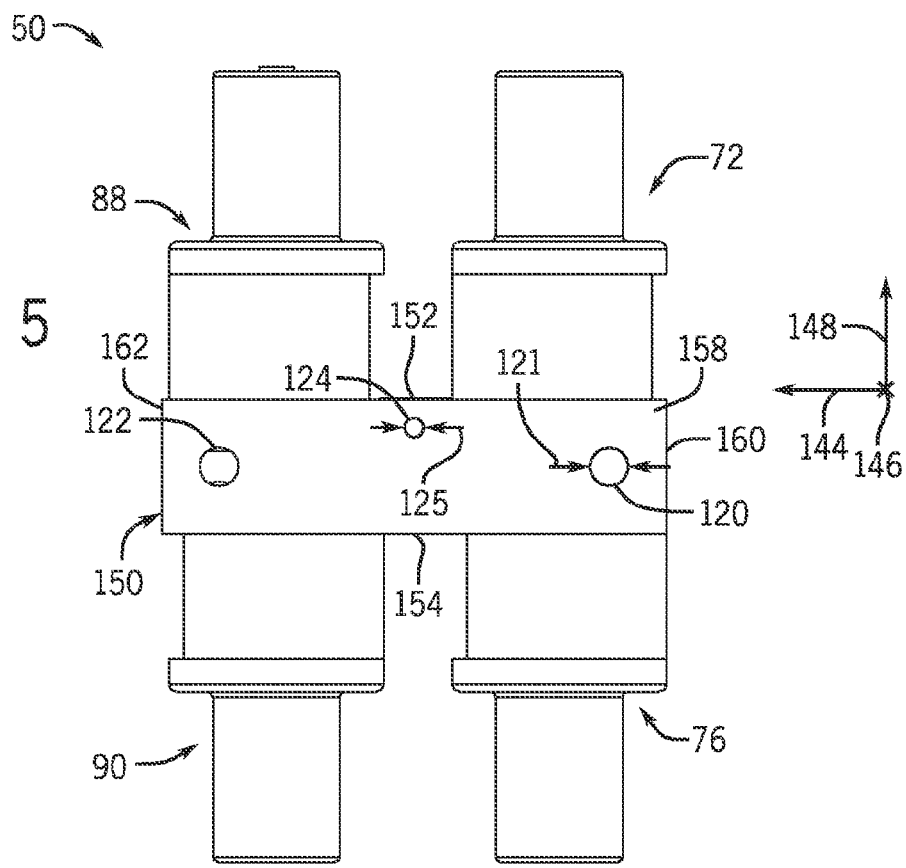

INTEGRATED FUEL AND WATER MIXING ASSEMBLY FOR USE IN CONJUNCTION WITH A COMBUSTOR

BACKGROUND OF THE INVENTION

The subject matter disclosed herein relates to combustion systems, and, more particularly, to supplying liquid fuel mixtures to gas turbine engines.

Various combustion systems include combustion chambers in which fuel and air combust to generate hot gases. For example, a gas turbine engine may include one or more combustion chambers that are configured to receive compressed air from a compressor, inject fuel into the compressed air, and generate hot combustion gases to drive the turbine engine. Each combustion chamber may be configured to receive one or more different fuels, such as gaseous fuels and liquid fuels. Certain materials may be mixed with the fuel to affect combustion efficiency and/or production of by-products, for example. Unfortunately, such mixtures left in an unused flow path may degrade, thereby decreasing performance and reliability of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a mixing assembly configured to mix a liquid fuel and a water to generate a fuel mixture. The fuel mixture is configured to combust in a combustor of a gas turbine. The mixing assembly includes a liquid fuel passage disposed in an integrated housing. The liquid fuel passage is configured to flow the liquid fuel and to exclude liquid traps. The mixing assembly also includes a water passage disposed in the integrated housing. The water passage is configured to flow the water and to exclude liquid traps. The mixing assembly also includes a mixer disposed in the integrated housing and coupled to the liquid fuel passage and the water passage. The mixer is configured to mix the liquid fuel and the water to form the fuel mixture.

In a second embodiment, a system includes a valve assembly configured to mix a liquid fuel and a water to generate a fuel mixture. The fuel mixture is configured to combust in a combustor of a gas turbine. The valve assembly includes an integrated housing, a liquid fuel valve directly coupled to the integrated housing and configured to adjust a flow rate of the liquid fuel, and a water valve directly coupled to the integrated housing and configured to adjust a flow rate of the water. The liquid fuel valve and the water valve are proximate to one another. The valve assembly also includes liquid fuel valve and the water valve are proximate to one another. The passage is configured to exclude liquid traps. The system also includes a controller configured to transmit a signal to at least one of the liquid fuel valve and the water valve. The liquid fuel valve and the water valve are responsive to the signal, to adjust a composition of the fuel mixture.

In a third embodiment, a system includes an integrated valve assembly. The integrated valve assembly includes a main fuel inlet port configured to receive a main fuel, a main fuel passage coupled to the main fuel inlet port and configured to route the main fuel to a first mixing tee, a main fuel valve coupled to the main fuel passage and configured to adjust a main flow rate of the main fuel, a water inlet port configured to receive water, and a water passage coupled to the water inlet port and configured to route the water to the first mixing tee. The main fuel passage and the water passage are configured to exclude liquid traps, and the first mixing tee is configured to generate a main fuel mixture. The integrated valve assembly also includes a main fuel mixture outlet port configured to discharge the main fuel mixture and a first water valve coupled to the water passage and configured to adjust a first water flow rate of the water. The main fuel valve and the first water valve are proximate to one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a rear view of an embodiment of an integrated valve assembly; and

FIG. 6 is a front perspective view of an embodiment of a manifold of an integrated valve assembly.

DETAILED DESCRIPTION OF THE INVENTION

Figure 1:
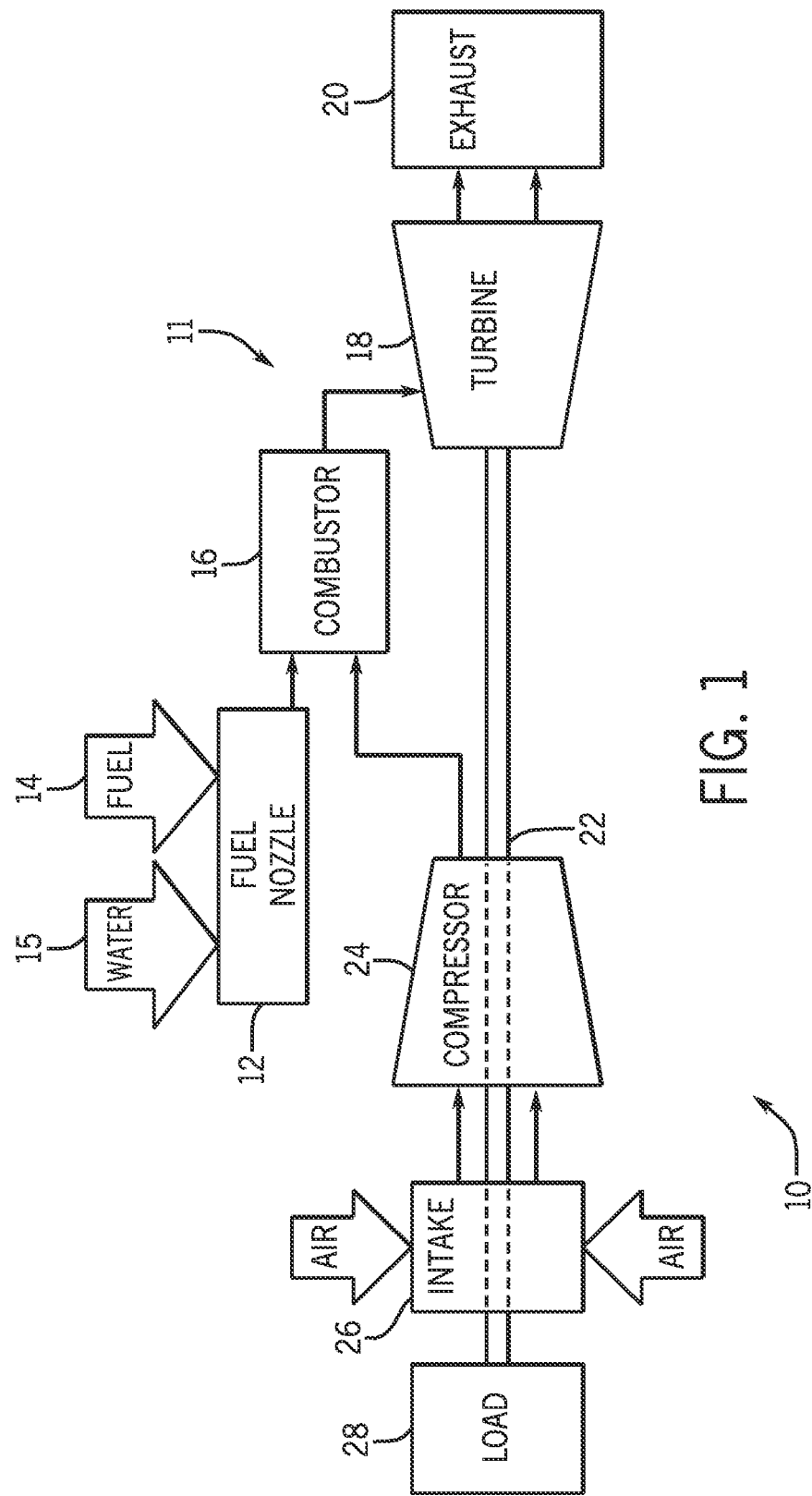
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments provide systems for mixing a fuel with water and supplying the mixture of fuel and water to a turbine combustor. For example, the turbine combustor may be a gas turbine combustor disposed in a gas turbine engine. In certain embodiments, the gas turbine combustor may combust either a gaseous fuel, such as natural gas, syngas, or substitute natural gas, or a liquid fuel, such as diesel fuel. The gaseous fuel may be supplied to the gas turbine combustor via a gaseous fuel path and the liquid fuel may be supplied via a liquid fuel flow path separate from the gaseous flow path. The gas turbine combustor may primarily combust the gaseous fuel and, when the gaseous fuel is unavailable, combust the liquid fuel. Thus, even if a supply of gaseous fuel is interrupted, operation of the turbine combustor may continue by using the liquid fuel. However, use of gaseous fuel may be preferable because combustion of the liquid fuel may be less efficient than combustion of the gaseous fuel, and because combustion of the liquid fuel may generate more byproducts in an exhaust from the gas turbine engine than combustion of the gaseous fuel. These byproducts may include nitrogen oxides ($NO_x$), sulfur oxides ($SO_x$), carbon monoxide (CO), particulate matter, and so forth.

When liquid fuel is used in the gas turbine combustor, water may be mixed with the liquid fuel prior to introduction into the gas turbine combustor to help reduce byproduct (e.g., $NO_x$, $SO_x$, CO, or particulate matter) production. The added water may aid in cooling the reaction zone in the gas turbine combustor, which may reduce byproduct production. Specifically, the water vaporizes into steam in the reaction zone, which helps to reduce the temperature of the reaction zone. In certain embodiments, a mixing assembly may mix the water and liquid fuel to generate a fuel mixture. The mixing assembly may be an integrated housing that includes a plurality of components. For example, the integrated housing may include a liquid fuel passage that flows the liquid fuel through the integrated housing. Similarly, the integrated housing may include a water passage that flows the water through the integrated housing. Both the liquid fuel passage and the water passage may exclude liquid traps, which may be defined as areas in which liquids may accumulate when not flowing through the integrated housing. Thus, excluding liquid traps may refer to substantially reducing or eliminating regions that liquids may accumulate and cannot be removed or drained. One manner to exclude liquid traps in the integrated housing may include utilizing downward slopes in the passages, such that the liquid fuel and/or the water may drain out of the integrated housing without being trapped within the integrated housing. In certain embodiments, the downward slopes may be continuous downward slopes, with no horizontal or upward portions. In other embodiments, the downward slopes may include downward portions and horizontal portions, but no upward portions. By excluding liquids traps, the integrated housing helps to prevent stagnant liquid fuel from degrading and potentially forming a coking buildup in the flow path within the integrated housing. The coking buildup may cause changes in system flow characteristics, thereby causing the gas turbine combustor to operate inefficiently. The coking buildup could also partially block downstream fuel nozzles. In further embodiments, the mixing assembly may include a mixer disposed in the integrated housing and coupled to the liquid fuel passage and the water passage. The mixer may mix the liquid fuel and the water to form the fuel mixture. The mixer may improve the uniformity of the fuel mixture. Inadequately mixed fuel mixtures may cause uneven combustion within the gas turbine combustor.

In other embodiments, the integrated housing may include the fuel flow path, a water flow path, and/or a path for a mixture of both fuel and water. By excluding liquid fuel traps, the internal surfaces of the flow paths may be generally smooth to enable fluid flow free of bumps, sharp corners, recesses, steps, sharp diameter changes, and so forth. Thus, any remaining fuel may be carried away by water flow through the fuel passages to help prevent any coking buildup.

In further embodiments, the integrated housing may include additional components to help generate a uniform fuel mixture. For example, the liquid fuel passage may include a liquid fuel valve that adjusts a flow rate of the liquid fuel. Similarly, the water passage may include a water valve that adjusts a flow rate of the water. In certain embodiments, the liquid fuel valve and the water valve are proximate to one another. Thus, lengths of the passages within the integrated housing may be reduced to facilitate purging and cleanup of the integrated housing. In further embodiments, a controller may transmit a signal to the liquid fuel valve and/or the water valve to adjust a composition of the fuel mixture. The signal may be mechanical or electrical. In certain embodiments, water from the water valve may flow backward through the liquid fuel valve and the liquid fuel passage to help clean or purge any remaining oil left in the liquid fuel valve and liquid fuel passage.

Turning now to the drawings and referring first to FIG. 1, a block diagram of an embodiment of a turbine system 10 having a gas turbine engine 11 is illustrated. The turbine system 10 may use liquid or gaseous fuel, such as natural gas and/or a synthetic gas, to drive the turbine system 10. As depicted, one or more fuel nozzles 12 intake a fuel supply 14. For example, one or more fuel nozzles 12 may be used to intake liquid fuel, and one or more other fuel nozzles 12 may be used to intake gaseous fuel. In addition, the fuel nozzles 12 may intake a water supply 15 when the turbine system 10 uses liquid fuel. As described in detail below, the disclosed turbine system 10 mixes the liquid fuel with the water supply 15 upstream from and/or within the fuel nozzles 12. Mixing the liquid fuel with the water 15 may improve the efficiency of byproduct (e.g., $NO_x$, $SO_x$, CO, or particulate matter) suppression, thereby reducing production and exhaust of the byproducts from the gas turbine engine 11. The fuel nozzles 12 then further mix the fuel, or the fuel-water mixture, with air, and distribute the fuel, water (when used), and air mixture into the combustor 16 where further mixing occurs between the fuel, water (when used), and air. Although shown schematically as being outside or separate from the combustor 16, the fuel nozzles 12 may be disposed inside the combustor 16. The fuel, water (when used), and air mixture combusts in a chamber within the combustor 16, thereby creating hot pressurized exhaust gases. The combustor 16 directs the exhaust gases through a turbine 18 toward an exhaust outlet 20. Although only one combustor 16 is shown in FIG. 1, in certain embodiments, a plurality of combustors 16 may be arranged circumferentially about the gas turbine engine 11. Each of the plurality of combustors 16 may include separate fuel nozzles 12. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
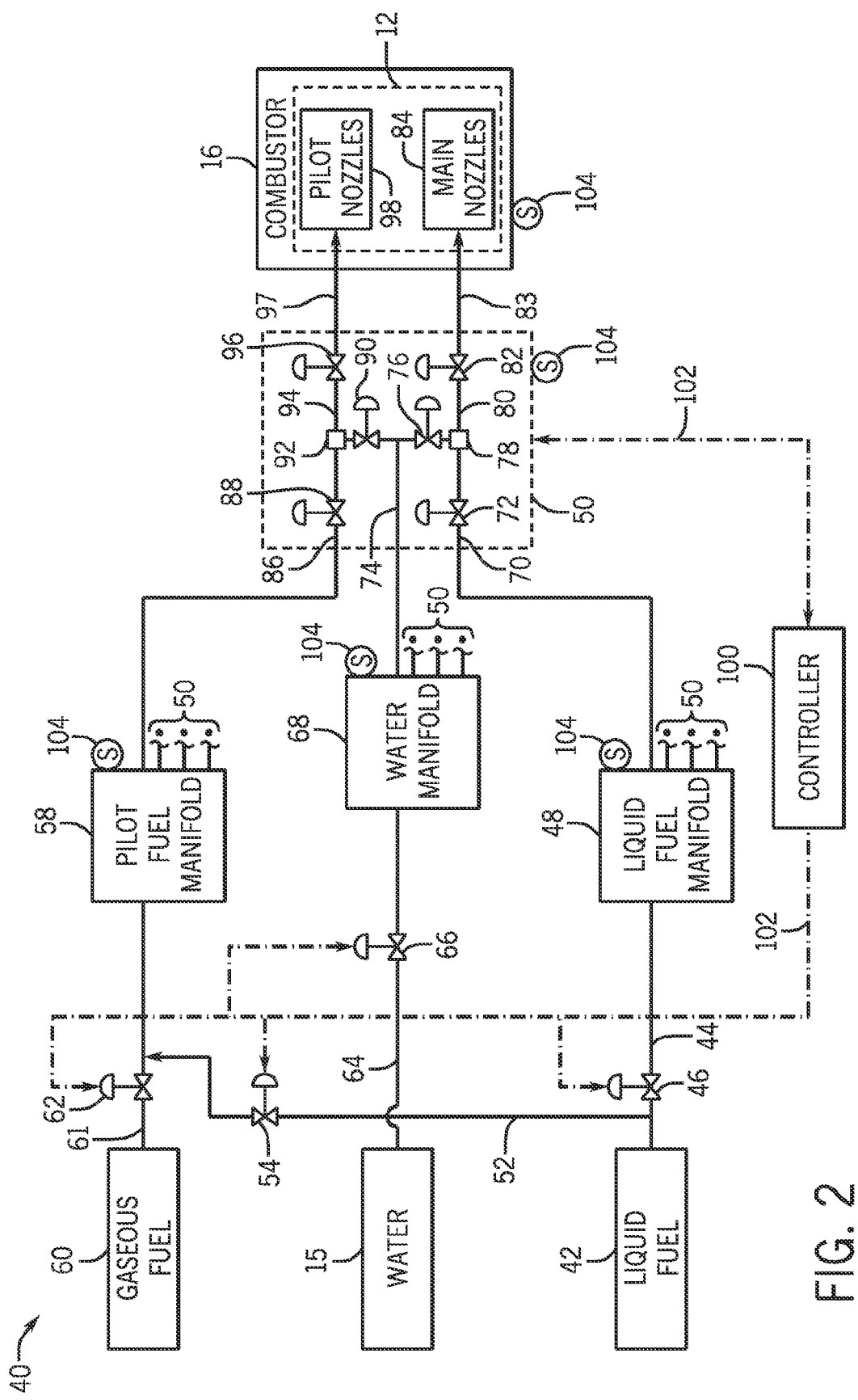
FIG. 2 is a block diagram of an embodiment of a fuel supply system for a turbine combustor.

FIG. 2 illustrates a block diagram of a turbine fuel supply system 40 of the combustor 16 of the gas turbine engine 11, as illustrated in FIG. 1. In the following discussion, the term "valve" is used to refer to any device capable of operating as a flow control. As illustrated, a liquid fuel 42 may be supplied to the combustor 16. Examples of the liquid fuel 42 include, but are not limited to, hydrocarbon based liquid fuels, such as diesel fuel, jet fuel, gasoline, naphtha, fuel oil, and so forth. The liquid fuel 42 is routed to the combustor 16 via a liquid fuel flow path 44, which may include a liquid fuel supply valve 46. The liquid fuel flow path 44 may also include a liquid fuel manifold 48, which may be used to supply the liquid fuel 42 to a plurality of mixing assemblies 50 (as indicated by vertical dots), which may be, for example, arranged circumferentially about the liquid fuel manifold 48. In certain embodiments, the liquid fuel manifold 48 may be configured as a ring with a circular or polygonal shape. Each of the plurality of mixing assemblies 50 may be coupled to one of the plurality of combustors 16 arranged circumferentially about the gas turbine engine 11. The liquid fuel supply valve 46 may be used to adjust and/or isolate flow of the liquid fuel 42 to the liquid fuel manifold 48. In certain embodiments, each mixing assembly 50 may include a plurality of valves and passages, as discussed in detail below, to mix the liquid fuel 42 with the water 15.

In certain embodiments, a portion of the liquid fuel 42 may be routed to a pilot fuel flow path 52, which may include a pilot fuel supply valve 54. The pilot fuel flow path 52 may be used when first starting the combustor 16 with the liquid fuel 42. For example, the pilot fuel flow path 52 may flow a lower flow rate of the liquid fuel 42 than the liquid fuel flow path 44. In certain embodiments, the flow rate of the liquid fuel 42 through the pilot fuel flow path 52 may be between approximately 5 percent to 50 percent, 10 percent to 35 percent, or 15 percent to 25 percent of a normal, or regular, flow rate through the liquid fuel flow path 44. For example, the flow rate of the liquid fuel 42 through the pilot fuel flow path 52 may be approximately 5, 10, 15, 20, 25, 30, 35, 40, 45, or 50 percent of the normal flow rate through the liquid fuel flow path 44. A low flow rate of the liquid fuel 42, which may be referred to as pilot fuel, may be used to first start the combustor 16. Afterwards, the liquid fuel flow path 44 may be used to supply the normal, or regular, flow rate of the liquid fuel 42 to the combustor 16. The pilot fuel flow path 52 may also continue to be used together with the liquid fuel flow path 44 for reasons discussed in detail below. During startup of the combustor 16, the liquid fuel 42 from the pilot fuel supply valve 54 may be routed to a pilot fuel manifold 58, which may be used to supply pilot fuel to the plurality of mixing assemblies 50 (as indicated by vertical dots). In certain embodiments, the pilot fuel manifold 58 may be configured as a ring with a circular or polygonal shape. The pilot fuel supply valve 54 may be used to adjust and/or isolate flow of the liquid fuel 42 to the pilot fuel manifold 58. When the combustor 16 is no longer combusting the liquid fuel 42, a gaseous fuel 60 may be supplied to the pilot fuel manifold 58 via a gaseous fuel flow path 61, thereby purging the liquid fuel 42 from the pilot fuel manifold 58 with the gaseous fuel 60. Examples of the gaseous fuel 60 include, but are not limited to, methane, natural gas, syngas, and so forth. The gaseous fuel flow path 61 may include a gaseous fuel supply valve 62, which may be used to adjust and/or isolate flow of the gaseous fuel 60. Purging the pilot fuel flow path 52 with the gaseous fuel 60 may help to substantially reduce or prevent coking or oxidizing of the liquid fuel 42 in the pilot fuel flow path 52 when not in use. In other embodiments, other gases, such as nitrogen, carbon dioxide, steam, and so forth, may be used to purge the pilot fuel flow path 52 when not in use.

The water 15 may be supplied to the combustor 16 via a water flow path 64, which may include a water supply valve 66. Examples of the water 15 include, but are not limited to, boiler feedwater, deaerated water, steam condensate, demineralized water, and so forth. Such water 15 may already be available elsewhere in the plant or facility where the gas turbine engine 11 is located. Thus, the water supply system for the turbine fuel supply system 40 may not include a separate, dedicated water supply system. The water supply valve 66 may be used to adjust and/or isolate a flow of the water 15 to a water manifold 68, which may be used to supply the water 15 to the plurality of mixing assemblies 50 (as indicated by vertical dots). In certain embodiments, the water manifold 68 may be configured as a ring with a circular or polygonal shape.

Each of the plurality of mixing assemblies 50 may include a variety of components to help produce uniform mixtures of the liquid fuel 42 and the water 15. For example, each mixing assembly 50 may include a liquid fuel passage 70 that flows the liquid fuel 42 to a liquid fuel mixing valve 72, which may be used to adjust a flow rate of the liquid fuel 42 through the mixing assembly 50. For example, the liquid fuel mixing valve 72 may be an on/off valve or a throttling valve. Similarly, the mixing assembly 50 may include a water passage 74 that flows the water 15 into the mixing assembly 50. The water passage 74 may include a liquid fuel water mixing valve 76, which may be used to adjust a flow rate of the water 15 to be mixed with the liquid fuel 42 flowing through the liquid fuel passage 70. For example, the liquid fuel water mixing valve 76 may be an on/off valve or a throttling valve. The liquid fuel 42 and the water 15 combine at a mixer 78 that mixes the liquid fuel 42 and the water 15 to form a liquid fuel mixture 80. In certain embodiments, the liquid fuel mixture 80 may be an emulsion of the liquid fuel 42 and the water 15. Examples of the mixer 78 include, but are not limited to, a mixing tee, an inline mixer, a static mixer, a paddle mixer, a blender, a ribbon blender, and so forth. The mixer 78 generates a uniform mixture of the liquid fuel 42 and the water 15. When the gas turbine engine 11 is not combusting the liquid fuel 42 (e.g., combusting the gaseous fuel 60), the water 15 may be used to purge the liquid fuel passage 70. Specifically, the water 15 may flow backward through the liquid fuel mixing valve 72 and into the liquid fuel manifold 48, purging or displacing the liquid fuel 42. In certain embodiments, the mixing assembly 50 may include a liquid fuel proportioning valve 82 disposed downstream of the mixer 78. The liquid fuel proportioning valve 82 may enable the flow of the liquid fuel mixture 80 along a main fuel flow path 83 to all of the combustors 16 of the gas turbine engine 11 if a pressure of the liquid fuel mixture 80 is above a threshold pressure. For example, the liquid fuel proportioning valve 82 may be a control valve, pressure valve, one-way valve, check valve, or any combination thereof. Thus, the liquid fuel proportioning valve 82 may help prevent backflow of gases from the combustor 16 into the mixing assembly 50. In other words, the liquid fuel proportioning valve 82 may enable flow of the liquid fuel mixture 80 into the combustor 16 only when the pressure of the liquid fuel mixture 80 exceeds a preset pressure. The liquid fuel mixture 80 from the mixing assembly 50 may then be routed to main nozzles 84 of the combustor 16 along the main fuel flow path 83.

In certain embodiments, the mixing assembly 50 may include a pilot fuel passage 86 that routes the pilot fuel to a pilot fuel mixing valve 88, which may be used to adjust a flow rate of the pilot fuel to the mixing assembly 50. For example, the pilot fuel mixing valve 88 may be an on/off valve or a throttling valve. The water passage 74 may include a pilot fuel water mixing valve 90 that flows the water 15 to a pilot fuel mixer 92, which may mix the pilot fuel and the water 15 to form a pilot fuel mixture 94. In certain embodiments, the pilot fuel mixture 94 may be an emulsion of the pilot fuel and the water 15. For example, the pilot fuel water mixing valve 90 may be an on/off valve or a throttling valve. Examples of the pilot fuel mixer 92 include, but are not limited to, a mixing tee, an inline mixer, a static mixer, a paddle mixer, a blender, a ribbon blender, and so forth. When the gas turbine engine 11 is not combusting the liquid fuel 42 (e.g., combusting the gaseous fuel 60), the water 15 may be used to purge the pilot fuel passage 86. Specifically, the water 15 may flow backward through the pilot fuel mixing valve 88 and into the pilot fuel manifold 58, purging or displacing the liquid fuel 42. In some embodiments, the pilot fuel mixture 94 may be routed to a pilot fuel pressurizing valve 96, which may enable flow of the pilot fuel mixture 94 along a first pilot fuel flow path 97 if a pressure of the pilot fuel mixture 94 is above a threshold pressure. For example, the pilot fuel pressurizing valve 96 may be a control valve, pressure valve, one-way valve, check valve, or any combination thereof. Thus, the pilot fuel pressurizing valve 96 may help to prevent backflow of gases from the combustor 16 into the mixing assembly 50. The pilot fuel mixture 94 from the pilot fuel pressurizing valve 96 may then be routed to pilot nozzles 98 of the combustor 16 along the first pilot fuel flow path 97. The pilot nozzles 98 may be smaller than the main nozzles 84 to enable the pilot nozzles 98 to inject the liquid fuel 42 into the combustor 16 at a lower flow rate than the main nozzles 84, but with enough nozzle pressure drop to generate an ignitable spray of liquid fuel. The pilot nozzles 98 may be continuously purged with the gaseous fuel 60 when the combustor 16 is not combusting the liquid fuel 42 to help block hot combustion products (e.g., air, carbon dioxide, water vapor, and so forth) from entering and degrading the small orifices of the pilot nozzles 98. When the combustor 16 is combusting the liquid fuel 42, the pilot nozzles 98 may inject the liquid fuel 42 concurrently with the main nozzles 84 as the pilot nozzles 98 may be cooled by the flow of the pilot fuel mixture 94 through the pilot nozzles 98.

In certain embodiments, the turbine fuel supply system 40 may include a controller 100, which may send and/or receive various signals along signal paths 102. In the following discussion, the signals sent or received along the signal paths 102 will also be referred to by the reference numeral 102. For example, the controller 100 may send signals 102 to one or more of the liquid fuel supply valve 46, the pilot fuel supply valve 54, the gaseous fuel supply valve 62, the water supply valve 66, the liquid fuel mixing valve 72, the liquid fuel water mixing valve 76, the liquid fuel proportioning valve 82, the pilot fuel mixing valve 88, the pilot fuel water valve 90, and the pilot fuel pressurizing valve 96 to direct the valves to open or close. In addition, the controller 100 may receive signals 102 from sensors 104 disposed in the turbine fuel supply system 40, such as, but not limited to, pressure sensors, temperature sensors, flow rate sensors, composition sensors, and so forth. In certain embodiments, the controller 100 may adjust a ratio of the liquid fuel 42 to the water 15 based on the signals 102 received from the sensors 104.

Figure 3:
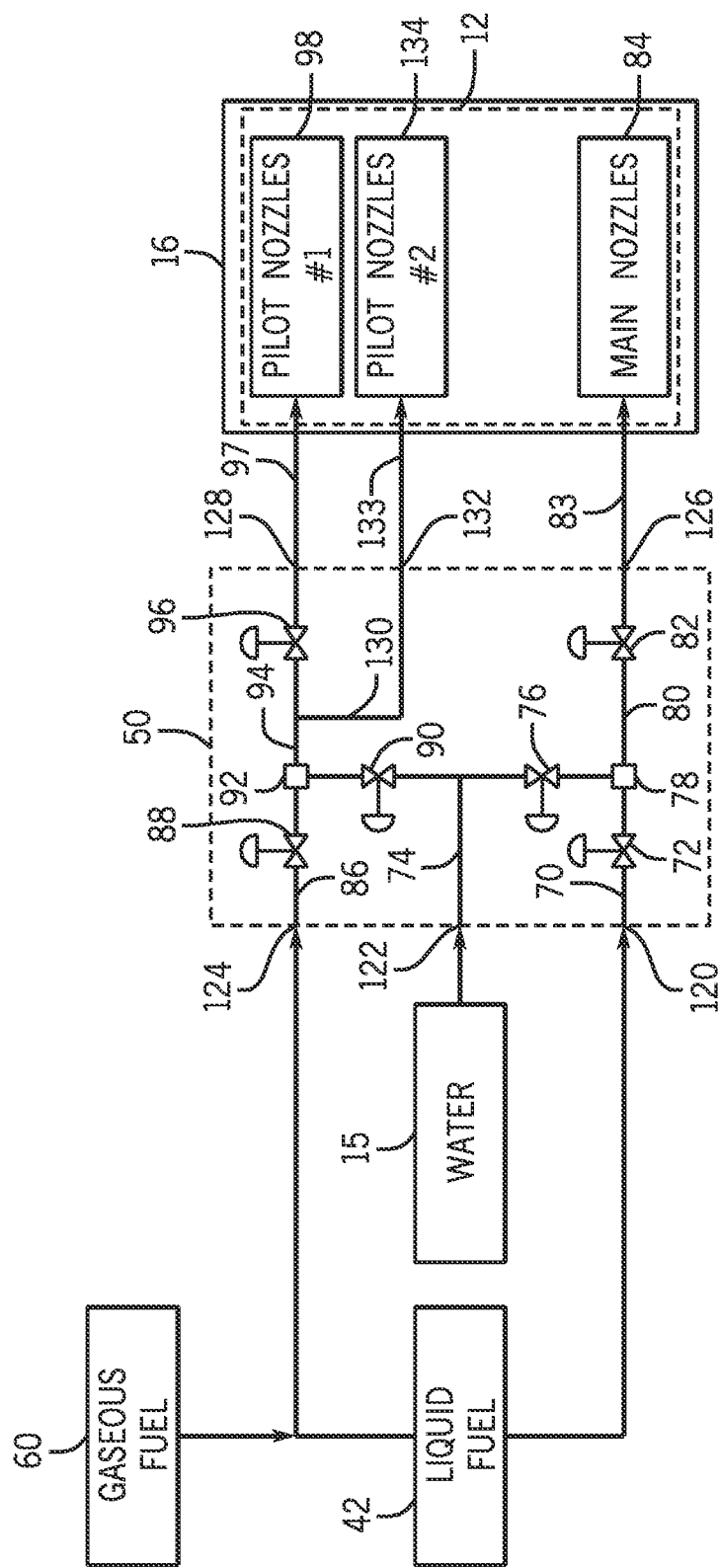
FIG. 3 is a block diagram of an embodiment of a fuel supply system for a turbine combustor.

FIG. 3 illustrates a block diagram of another embodiment of the turbine fuel supply system 40. As shown in FIG. 3, the mixing assembly 50 includes a main fuel inlet port 120 that receives the liquid fuel 42. The main fuel inlet port 120 is coupled to the main fuel passage 70. In addition, the mixing assembly 50 includes a water inlet port 122 that receives the water 15. The water inlet port 122 is coupled to the water passage 74. Further, the mixing assembly 50 includes a pilot fuel inlet port 124 that receives the pilot fuel. The pilot fuel inlet port 124 is coupled to the pilot fuel passage 86. The mixing assembly 50 may also include a main fuel mixture outlet port 126 that discharges the liquid fuel mixture 80 to the main nozzles 84. Similarly, the mixing assembly 50 may include a pilot fuel mixture outlet port 128 that discharges the pilot fuel mixture to the pilot nozzles 98 along the first pilot fuel flow path 97. In certain embodiments, a portion 130 of the pilot fuel mixture 94 may be supplied directly to a second pilot fuel outlet port 132. In other words, the portion 130 of the pilot fuel mixture 94 does not flow through the pilot fuel pressurizing valve 96. Instead, the portion 130 of the pilot fuel mixture 94 flows along a second pilot fuel flow path 133 to a second set 134 of pilot nozzles of the combustor 16. The pressurizing valve 96 is used to flow the pilot fuel mixture 94 when the pressure threshold of the mixture 94 is reached. In other words, the function of the pressurizing valve 96 is to sequentially wet the pilot nozzles 134 and 98.

Figure 4:
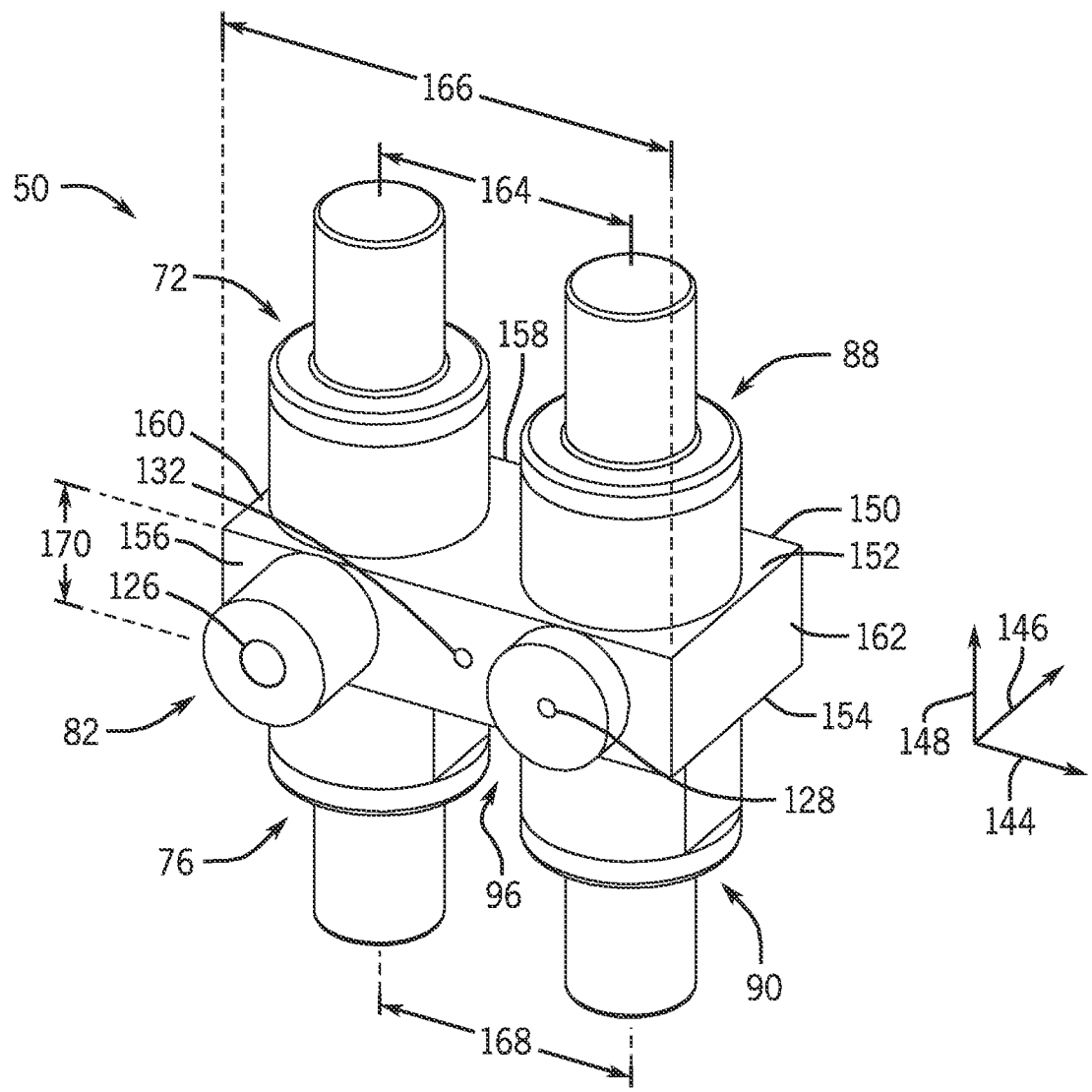
FIG. 4 is a perspective view of an embodiment of an integrated valve assembly.

FIG. 4 illustrates a perspective view of an embodiment of the mixing assembly 50. In the following discussion, reference may be made to an x-axis 144, a y-axis 146, and a z-axis 148. As shown in FIG. 4, the mixing assembly 50 includes an integrated housing 150, or integrated valve assembly. The integrated housing 150 includes a top side 152, a bottom side 154, a front side 156, a back side 158, a left side 160, and a right side 162. As shown in FIG. 4, the integrated housing 150 may be a generally rectangular shaped assembly. However, in other embodiments, the integrated housing 150 may have other shapes to accommodate the particular arrangement of the turbine fuel supply system 40. In addition, the integrated housing 150 may include a plurality of openings, or ports, to accommodate connections to equipment of the turbine fuel supply system 40. Further, the actuators of the liquid fuel mixing valve 72 and the pilot fuel mixing valve 88 may be located on the top side 152. Similarly, the actuators for the liquid fuel water mixing valve 76 and the pilot fuel water mixing valve 90 may be located on the bottom side 154. Thus, the actuators for the valves 72, 76, 88, and 90, may be oriented along multiple axes to reduce the space or volume taken up by the valves. In other embodiments, the actuators for the various valves 72, 76, 88, and 90 may be located in different locations of the integrated housing 150. The valves 72, 76, 82, 88, 90, and 96 may be coupled directly to the integrated housing 150 and at least partially disposed in bores or openings drilled or formed in the integrated housing 150. In addition, the main fuel outlet port 126 may be located at the center of the liquid fuel proportioning valve 82, and the pilot fuel outlet port 128 may be located at the center of the pilot fuel pressurizing valve 96. In other embodiments, the main fuel outlet port 126 and the pilot fuel outlet port 128 may be located in different locations of the integrated housing 150. The second pilot fuel outlet port 132 may be located on the front side 156 between the liquid fuel proportioning valve 82 and the pilot fuel pressurizing valve 96. In other embodiments, the second pilot fuel outlet port 132 may be located in a different location of the integrated housing 150 or may be omitted. As shown in FIG. 4, the valves 72, 76, 82, 88, 90, and 96 of the integrated housing 150 are proximate to one another. For example, a distance 164 between centerlines of the valves 72 and 88 may be between approximately 30 to 80 percent, 40 to 70 percent, or 50 to 60 percent of a width 166 of the integrated housing 150. Similarly, a distance 168 between centerlines of the valves 76 and 90 may be between approximately 30 to 80 percent, 40 to 70 percent, or 50 to 60 percent of the width 166 of the integrated housing 150. Thus, the distances 164 and/or 168 may be approximately 30, 40, 50, 60, 70, or 80 percent of the width 166. Further, the valves 72 and 76 may be separated by a height 170 of the integrated housing 150. Similarly, the valves 88 and 90 may be separated by the height 170 of the integrated housing 150. Thus, the integrated housing 150 may be compact with a reduced volume to reduce the amount of the liquid fuel 42 that may degrade inside the integrated housing 150. Further, the length of passages between the valves 72, 76, 82, 88, 90, and 96 may be reduced to facilitate purging and cleaning of the integrated housing 150.

FIG. 5 illustrates a rear view of an embodiment of the mixing assembly 50. As shown in FIG. 5, the back side 158 includes main fuel inlet port 120, water inlet port 122, and pilot fuel inlet port 124. In certain embodiments, the main fuel inlet port 120 is located near the side 160 and adjacent to the liquid fuel mixing valve 72. In certain embodiments, the water inlet port 122 is located near the side 162 and adjacent to the pilot fuel water mixing valve 90. In some embodiments, the pilot fuel inlet port 124 is located near the middle of the back side 158, or in between the main fuel inlet port 120 and the water inlet port 122. In certain embodiments, a diameter 121 of the main fuel inlet port 120 may be greater than a diameter 125 of the pilot fuel inlet port 124 because a flow rate of the liquid fuel 42 along path 44 may be greater than a flow rate of the pilot fuel along path 52. For example, a ratio of the diameter 121 to the diameter 125 may be between approximately 1.1:1 to 6:1, 1.3:1 to 4:1, or 1.5:1 to 2.5:1. In certain embodiments, the ratio of the diameter 121 to the diameter 125 may be approximately 1.1, 1.3, 1.5, 2, 2.5, 3, 4, 5, or 6. In another embodiment, the water inlet port 122 may be located near the middle of the back side 158, or in between the main fuel inlet port 120 and the pilot fuel inlet port 124.

FIG. 6 illustrates a perspective view of an embodiment of various passages 180 within the integrated housing 150. Elements in FIG. 6 in common with those shown in FIGS. 4 and 5 are labeled with the same reference numerals. For clarity purposes, the valves 72, 76, 88, and 90 are not shown in FIG. 6. Instead, circles are used in FIG. 6 to represent the locations of the valves 72, 76, 88, and 90. As shown in FIG. 6, the liquid fuel passage 70 is routed directly from the main fuel inlet port 120 to the liquid fuel mixing valve 72. In other words, the liquid fuel passage 70 is routed to reduce the length of the passage 70. Similarly, the water passage 74 is routed directly from the water inlet port 122 to the liquid fuel water mixing valve 76 and the pilot fuel water mixing valve 90. The pilot fuel passage 86 is routed directly from the pilot fuel inlet port 124 to the pilot fuel mixing valve 88. Thus, the passages 180 within the integrated housing 150 are routed in a direct manner to reduce the lengths of the passages 180, thereby reducing the inventory of material left in the passages 180 when not in use. For example, the passages 180 may be formed by drilling holes or bores into a solid block of metal to produce a one-piece integrated housing 150. In other embodiments, holes or bores may be drilled into two or more blocks of metal that are then coupled together to form a multi-piece integrated housing 150. In other words, the passages 180 are completely integrated within the integrated housing 150. In addition, the lengths of the passages 180 may be less than lengths of external piping or tubing that is not within the integrated housing 150. Further, the integrated housing 150 may be less cluttered and complicated than a network of external piping or tubing. The passages 180 may be formed in different directions depending on the particular arrangement of the integrated housing 150. In addition, cleaning and purging of the passages 180 within the integrated housing 150 is made easier and faster by reducing the lengths of the passages 180. Further, forming the passages 180 out of a block of metal may reduce the possibility of leaks from the passages 180. In other words, using the integrated housing 150 avoids the joints, flanges, fittings, connections, and so forth associated with external piping and tubing. The passages 180 in the integrated housing 150 also facilitate placement of the valves 72, 76, 82, 88, 90, and 96 in close proximity to one another. In certain embodiments, the passages 180 within the integrated housing 150 may have a circular cross-sectional shape and/or be internally smooth to help reduce locations where liquids may accumulate when not flowing through the passages 180.

Low spots and other locations where liquids may accumulate are referred to as liquid traps. In certain embodiments, the passages 180 may have continuous downward slopes to help exclude liquid traps. In other words, the passages may be angled at an angle 181 with respect to a horizontal plane 183 containing the x-axis 144 and the y-axis 146. In certain embodiments, the angle 181 may be between approximately 1 to 45 degrees, 2 to 25 degrees, or 3 to 5 degrees. For example, the angle 181 may be approximately 1, 2, 3, 5, 10, 15, 20, 25, 30, 35, 40, or 45 degrees. In other embodiments, the passages 180 may have downward slopes that include downwardly sloping portions and horizontal portions, but not upwardly sloping portions. Thus, liquids may be able to drain freely out of the passages 180. In certain embodiments, additional drain lines or passages 182 may be coupled to ends and/or elbows of the passages 180 and to drain ports 184 to provide additional drainage capacity for the passages 180. Thus, the passages 180 exclude locations where liquids may be trapped within the integrated housing 150.

As discussed above, various embodiments of the turbine fuel supply system 40 include the mixing assembly 50 to provide mixing of the liquid fuel 42 with the water 15 upstream of the combustor 16 to form the liquid fuel and pilot fuel mixtures 80 and 94. Such mixing of the water 15 with the liquid fuel 42 may help to reduce temperatures within the combustor 16 and help reduce formation of byproducts, such as $NO_x$. Premixing of the water 15 and the liquid fuel 42 may also be more efficient at reducing $NO_x$ generation than injecting the water 15 into the combustor 16. For example, the liquid fuel and pilot fuel mixtures 80 and 94 may have a lower viscosity and surface tension than the liquid fuel 42, thereby improving atomization, dispersion, and the evaporation rate of the mixtures 80 and 94 in the combustor 16. Thus, use of the mixing assembly 50 enables less water 15 to be used in reducing $NO_x$ generation because of the greater efficiency of $NO_x$ suppression provided by the mixtures 80 and 94. Further, the arrangement of the valves 72, 76, 88, and 90 (and optionally valves 82 and 96) in close proximity to one another within the mixing assembly 50 may facilitate purging and cleanup of the turbine fuel supply system 40 when not using the liquid fuel 42. Specifically, the configuration of the integrated housing 150 helps to reduce the amount of the liquid fuel 42 that is purged from the turbine fuel supply system 40, thereby improving the effectiveness of cleaning up any remaining liquid fuel 42. For example, the passages 180 of the integrated housing 150 exclude liquid traps where the liquid fuel 42 may accumulate and degrade into deposits that may later interfere with operation of the combustor 16. Thus, use of the mixing assembly 50 may facilitate switching the combustor 16 to and from combustion of the liquid fuel 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
 a mixing assembly configured to mix a liquid fuel and a water to generate a fuel mixture, wherein the fuel mixture is configured to combust in a combustor of a gas turbine, and the mixing assembly comprises:

a liquid fuel passage disposed in an integrated housing, wherein the liquid fuel passage is configured to flow the liquid fuel and to exclude liquid traps when a flow of the liquid fuel is absent in the integrated housing;

a water passage disposed in the integrated housing, wherein the water passage is configured to flow the water and to exclude liquid traps when a flow of the water is absent in the integrated housing; and a mixer disposed in the integrated housing and coupled to the liquid fuel passage and the water passage, wherein the mixer is configured to mix the liquid fuel and the water to form the fuel mixture;

wherein at least one of the liquid fuel passage or the water passage comprises a downward sloping portion with an angle of at least 1 degree with respect to a horizontal plane of the at least one of the liquid fuel passage or the water passage.

2. The system of claim 1, wherein the mixer comprises at least one of a mixing tee, an in-line mixer, a static mixer, a paddle mixer, a blender, or a ribbon blender, or a combination thereof.

3. The system of claim 1, wherein the mixing assembly comprises:
a liquid fuel valve directly coupled to the integrated housing and configured to adjust a flow rate of the liquid fuel; and
a water valve directly coupled to the integrated housing and configured to adjust a flow rate of the water, wherein the integrated housing is configured with the liquid fuel valve and the water valve proximate to one another.

4. The system of claim 3, comprising a controller configured to transmit a signal to at least one of the liquid fuel valve or the water valve, wherein the liquid fuel valve or the water valve is responsive to the signal to adjust a ratio in the fuel mixture of the liquid fuel and the water.

5. The system of claim 1, wherein the mixing assembly is configured to mix the liquid fuel and the water to generate an emulsion of the liquid fuel and the water as the fuel mixture.

6. The system of claim 1, wherein the mixing assembly comprises a proportioning valve coupled to the integrated housing and the proportioning valve is configured to enable flow of the fuel mixture to the combustor if a pressure of the fuel mixture is above a threshold pressure.

7. The system of claim 1, wherein the water passage is configured to flow the water through the mixer and the liquid fuel passage to purge the liquid fuel from the mixing assembly when the fuel mixture is not being combusted in the combustor.

8. A system, comprising:
a valve assembly configured to mix a liquid fuel and a water to generate a fuel mixture, wherein the fuel mixture is configured to combust in a combustor of a gas turbine, and the valve assembly comprises:
an integrated housing;
a liquid fuel valve directly coupled to the integrated housing and configured to adjust a flow rate of the liquid fuel;
a water valve directly coupled to the integrated housing and configured to adjust a flow rate of the water, wherein the liquid fuel valve and the water valve are proximate to one another; and
a passage disposed in the integrated housing and configured to mix the liquid fuel and the water to form the fuel mixture, wherein the passage is configured to exclude liquid traps; and
a controller configured to transmit a signal to at least one of the liquid fuel valve or the water valve, wherein the liquid fuel valve or the water valve is responsive to the signal to adjust a composition of the fuel mixture.

9. The system of claim 8, wherein the water valve is configured to flow water through the liquid fuel valve and the passage to purge the liquid fuel from the valve assembly when the fuel mixture is not being combusted in the combustor.

10. The system of claim 8, wherein the passage is oriented at an angle with respect to a horizontal plane of the valve assembly.

11. The system of claim 8, wherein the passage is configured to mix the liquid fuel and the water to generate an emulsion of the liquid fuel and the water as the fuel mixture.

12. The system of claim 8, wherein the valve assembly comprises a pressurizing valve directly coupled to the integrated housing and the pressurizing valve is configured to enable flow of the fuel mixture to the gas turbine combustor if a pressure of the fuel mixture is above a threshold pressure of the fuel mixture.

13. A system, comprising:
an integrated valve assembly, comprising:
a main fuel inlet port configured to receive a main fuel;
a main fuel passage coupled to the main fuel inlet port and configured to route the main fuel to a first mixing tee;
a main fuel valve coupled to the main fuel passage and configured to adjust a main flow rate of the main fuel;
a water inlet port configured to receive water;
a water passage coupled to the water inlet port and configured to route the water to the first mixing tee, wherein the main fuel passage and the water passage are configured to exclude liquid traps when a flow of the main fuel is absent to the first mixing tee and when a flow of the water is absent to the first mixing tee, at least one of the main fuel passage or the water passage comprises a downward sloping portion with an angle of at least 1 degree with respect to a horizontal plane of the at least one of the main fuel passage or the water passage, and the first mixing tee is configured to mix the main fuel and the water to generate a main fuel mixture;
a main fuel mixture outlet port configured to discharge the main fuel mixture; and
a first water valve coupled to the water passage and configured to adjust a first water flow rate of the water, wherein the main fuel valve and the first water valve are proximate to one another.

14. The system of claim 13, wherein the integrated valve assembly comprises:
a pilot fuel inlet port configured to receive a pilot fuel;
a pilot fuel passage coupled to the pilot fuel inlet port and configured to route the pilot fuel to a second mixing tee;
a pilot fuel valve coupled to the pilot fuel passage and configured to adjust a pilot flow rate of the pilot fuel;
a second water passage coupled to the water inlet port and configured to route the water to the second mixing tee, wherein the second water passage is configured to exclude liquid traps, and the second mixing tee is configured to mix the pilot fuel and the water to generate a pilot fuel mixture;
a pilot fuel mixture outlet port configure to discharge the pilot fuel mixture; and
a second water valve coupled to the second water passage and configured to adjust a second water flow rate of the water to the second mixing tee, wherein the pilot fuel valve and the second water valve are proximate to one another.

15. The system of claim 14, wherein a first diameter of the main fuel inlet port is greater than a second diameter of the pilot fuel inlet port.

16. The system of claim 13, wherein the main fuel inlet port and water inlet port are disposed on a first side of the integrated valve assembly, the main fuel mixture outlet port is disposed on a second side of the integrated valve assembly, and the first and second sides of the integrated valve assembly are located opposite from one another.

17. The system of claim 13, wherein the integrated valve assembly comprises a proportioning valve coupled to the main fuel mixture outlet port, the proportioning valve is configured to enable flow of the main fuel mixture if a pressure of the main fuel mixture is above a threshold pressure of the main fuel mixture.

18. The system of claim 13, wherein the first water valve is configured to flow water through the main fuel valve and the main fuel passage to purge the main fuel from the integrated valve assembly when the main fuel mixture is not being used.

\* \* \* \* \*